United States Patent [19]
Pfeiffer

[11] Patent Number: 5,784,506
[45] Date of Patent: Jul. 21, 1998

[54] FREQUENCY-ENCODED OPTICAL CDMA TRANSMISSION SYSTEM AND OPTICAL RECEIVER THEREFOR

[75] Inventor: Thomas Pfeiffer, Stuttgart, Germany

[73] Assignee: Alcatel Alsthom Compagnie Generale d'Electricite, Paris, France

[21] Appl. No.: 800,192

[22] Filed: Feb. 13, 1997

[30] Foreign Application Priority Data

Feb. 15, 1996 [DE] Germany ............... 196 05 567.9

[51] Int. Cl.$^6$ ................................................ G02B 6/28
[52] U.S. Cl. ....................... 385/24; 369/59; 369/124
[58] Field of Search ................. 385/24, 147; 369/59, 369/124; 382/299, 268; 360/78.04, 78.06, 78.11

[56] References Cited

U.S. PATENT DOCUMENTS

| | | | |
|---|---|---|---|
| 4,866,699 | 9/1989 | Brackett et al. | 370/3 |
| 4,954,909 | 9/1990 | Sengoku | 360/78.04 |
| 5,566,253 | 10/1996 | Nakashima et al. | 382/299 |
| 5,661,709 | 8/1997 | Takagi et al. | 369/59 |

FOREIGN PATENT DOCUMENTS

| | | |
|---|---|---|
| 1532924 | 11/1978 | United Kingdom . |
| 2240683 | 8/1991 | United Kingdom . |
| 9428642 | 12/1994 | WIPO . |

OTHER PUBLICATIONS

Unger, Hans–George: "Optische Nachrichtentechnik, Elitera–Verlag", Berlin, 1976 pp. 115–118.

Hooijmans, Pieter W., et al. Why FSK and CPFSK Have Identical Linewidth Requirements. In: Journal of Lightwave Technology, vol. 12, No. 8, Aug. 1994, pp. 1412–1422.

"An Optical CDMA Method Based on Periodic Spectrum Encoding" by L. Möller, Proceedings of the 13th Annual Conference on European Fiber Optic Comm. England, 1995 pp. 178–181.

*Primary Examiner*—Akm E. Ullah
*Attorney, Agent, or Firm*—Ware, Fressola, Van Der Sluys & Adolphson LLP

[57] ABSTRACT

An optical frequency-encoded CDMA transmission system is presented in which received optical signals are decoded in the electric part of an optical receiver (12). To that end, the optical receiver (12) has a single photodetector (6) which converts received light into an electric signal, and which is directly or indirectly connected to a decoding unit (9, 10; 13, 14, 15), for recovering the information contained in the characteristic frequency-encoded spectrum.

8 Claims, 1 Drawing Sheet

FREQUENCY-ENCODED OPTICAL CDMA TRANSMISSION SYSTEM AND OPTICAL RECEIVER THEREFOR

TECHNICAL FIELD

The invention concerns an optical transmission system wherein at least one optical transmitter and at least one optical receiver are connected to a fiber-optic network, and wherein the at least one optical transmitter feeds light into the fiber-optic network which has a frequency-encoded spectrum characteristic of the at least one optical transmitter. The invention also concerns an optical receiver for an optical transmission system wherein at least one optical transmitter is connected to a fiber-optic network, and wherein the at least one optical transmitter feeds light into the fiber-optic network which has a frequency-encoded spectrum characteristic of the at least one optical transmitter.

BACKGROUND OF THE INVENTION

An optical transmission system which uses an optical CDMA method based on periodic spectrum encoding is known from the publication "An Optical CDMA Method Based on Periodic Spectrum Encoding" by L. Möller, Proceedings of the Thirteenth Annual Conference on European Fiber Optic Communications and Networks, Brighton, England, 1995, pages 178 to 181. Optical transmitters and receivers for such an optical transmission system are also known from this publication. The optical transmitters and receivers are connected to a fiber-optic network, whose structure is determined by an N×N star coupler.

In the described optical CDMA method, the power density spectrum of a light source is subjected to periodic spectrum encoding. The light source is a light-emitting diode which transmits light across a wide wavelength range, i.e. its spectrum has a large bandwidth (e.g. a 60 nm half-width). Every optical transmitter has a light-emitting diode and a periodic optical filter, which e.g. is a Fabry-Perot filter or a Mach-Zehnder interferometer. Light from the lightemitting diode, which is directly modulated by a data signal, is fed to the periodic optical filter, which has a periodic transmission characteristic. The free spectral range FSR and the half-power bandwidth $\Delta F$ are parameters of this periodic transmission characteristic. For example in the Fabry-Perot filter, these parameters depend on the distance to the mirror.

The publication indicates that there are further possibilities for spectrum encoding, e.g. the use of multimode lasers.

Light fed to the N×N star coupler therefore has a periodic spectrum, i.e. the power density spectrum comprises areas of high power density and areas of very low power density at regular intervals. Each optical transmitter transmits light which has a characteristic frequency-encoded (periodic) spectrum; the FSR provides the code word.

Each optical receiver (see FIG. 1 of the publication) has a coupler which separates the light emitted by the optical transmitters into two paths. The first path contains a photodetector which converts the light into an electric signal that is amplified by an amplifier and fed to an input of a differential amplifier. The second path contains a tunable periodic optical filter and a photodetector, which are arranged so that the light passes first through the periodic optical filter before it reaches the photodetector. The electric signal generated by the photodetector is fed to another input of the differential amplifier. The output of the differential amplifier is connected to a decision circuit.

The decoding in the optical transmission system takes place by the periodic optical filter in the optical part of the receiver. Optimum decoding takes place when $FSR_{sender} = FSR_{receive}$ applies. This means that the periodic optical filter in the optical receiver must be precisely adjusted to the periodic optical filter in the optical transmitter. Add to this that once the periodic optical filter is adjusted it must be frequency-stabilized, which requires a big effort.

SUMMARY OF THE INVENTION

The task of the invention is to present an optical transmission system wherein the decoding takes place in a simpler and therefore more economical manner. Such an optical transmission system is one wherein at least one optical transmitter and at least one optical receiver are connected to a fiber-optic network, and wherein the at least one optical transmitter feeds light into the fiber-optic network which has a frequency-encoded spectrum characteristic of the at least one optical transmitter, characterized in that the at least one optical receiver has a single photodetector which converts received light into an electric signal and which is connected, directly or indirectly, to a decoding device to recover the information contained in the characteristic frequency-encoded spectrum.

The invention has the additional task of presenting an optical receiver for an optical transmission system. Such an optical receiver is one for an optical transmission system wherein at least one optical transmitter is connected to a fiber-optic network, and wherein the at least one optical transmitter feeds light into the fiber-optic network which has a frequency-encoded spectrum characteristic of the at least one optical transmitter, characterized in that its input signal is light with a spectrum consisting of at least one characteristic frequency-encoded spectrum, and that it has a signal photodetector which converts the light into an electric signal and which is connected, directly or indirectly, to a decoding device to recover the information contained in the characteristic frequency-encoded spectrum.

The following advantages result from the basic idea of the invention, namely that the decoding does not take place in the optical part of the optical receiver, but in its electrical part. An electric band-pass filter located in the optical receiver is simple to tune electrically; this allows the code words (FSR) in the transmitters to be selected in a more flexibly manner. Furthermore the adjusted filter characteristic is more stable in optical filters than in electrical filters.

Decoding in the electrical part of the optical receiver makes it possible to take measures on the transmitting side which increase the flexibility of the optical transmission system. These measures include using a non-periodic optical filter in the optical transmitter, instead of a periodic optical filter.

BRIEF DESCRIPTION OF THE DRAWINGS

The invention is explained in greater detail in the following by means of configuration examples, where.

BEST MODE FOR CARRYING OUT THE INVENTION

Figure 1:
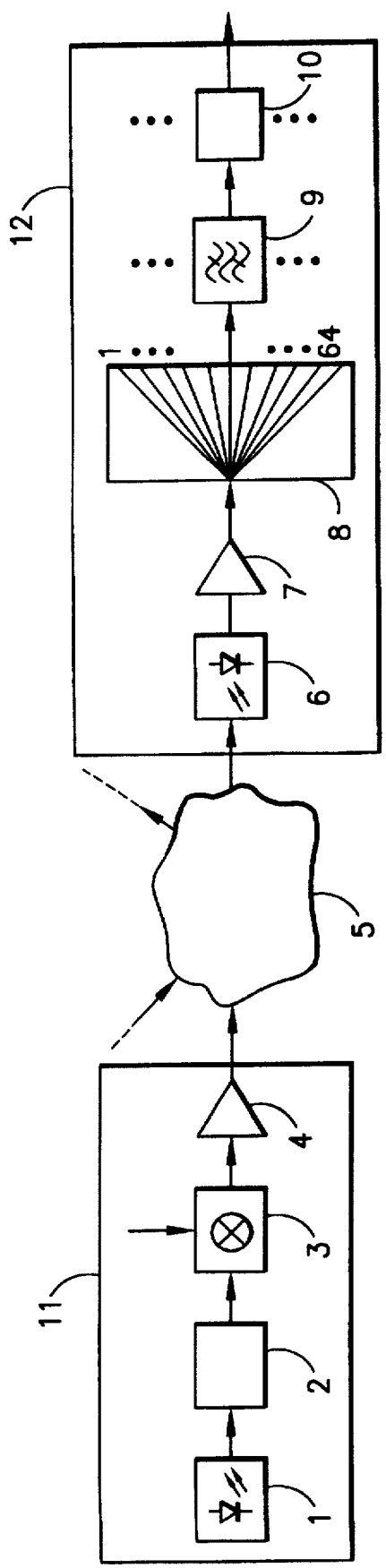
FIG. 1 is a-schematic optical transmission system with a first configuration example of an optical receiver and FIG. 2 is a second configuration example of an optical receiver.

FIG. 1 schematically illustrates an optical transmission system with a first configuration example of an optical receiver. An optical transmitter 11 and an optical receiver 12 are connected to a fiber-optic network 5. Several optical transmitters 11 and several optical receivers 12 may be connected to the fiber-optic network 5; this is indicated by arrows pointing toward and away from the fiber-optic network 5. However the structure of the optical transmission system can also be a tree structure, as it is used in so-called fiber-in-the-loop (FITL) systems. Television signals which are intended for subscribers who are connected to optical network terminals are distributed for example by a central station through a fiber-optic network. The optical network terminals contain optical transmitters for sending upward signals to the central station. These transmitters are configured as depicted in the detail of the optical transmitter 11 in FIG. 1. The central station contains a corresponding optical receiver 12.

The transmitter 11 depicted as an example contains the following interconnected components which are arranged from left to right: a light-emitting diode 1 as the light source, a periodic optical filter 2, an optical modulator 3 and an optical amplifier 4. Light emitted by the light-emitting diode 1, to which the periodic filter 2 bestows a periodic power density spectrum, is modulated externally by the optical modulator 3. The optical modulator 3 is controlled by a data signal. In principle, the light-emitting diode 1 can also be modulated directly (see L. Möller). The periodic optical filter 2 is e.g. a Fabry-Perot filter which has an FSR of about 10 GHz (=0.1 nm) and is also obtainable in a fiber-compatible configuration.

Signals are transmitted in the illustrated optical transmission system by means of the known CDMA method, which is based on periodic spectrum encoding (see L. Möller). The periodic power density spectrum generated by the periodic optical filter 2 is hereafter called a frequency-encoded spectrum. In this way the transmitter 11 feeds light to the fiber-optic network 5 which has a characteristic frequency-encoded spectrum; this makes it possible to differentiate between the transmitters in the optical transmission system. In principle, the illustrated optical transmission system can also have a different optical transmitter, e.g. the optical transmitter known from the L. Möller publication. It is important that the optical transmitter transmits light which has a frequency-encoded spectrum.

The optical receiver 12 contains the following interconnected components which are arranged from left to right: a photodetector 6, an amplifier 7, a branching device 8, a band-pass filter 9 and a demodulator 10. The band-pass filter 9 and the demodulator 10 form part of a decoding unit. The photodetector 6, which is designed for high carrier frequency signals in the range of about 10 GHz (e.g. a pin-photodiode), converts received light into an electrical signal which is amplified by the amplifier 7. The branching device 8 divides the amplified electric signal emerging from an output of amplifier 7 into e.g. 64 outputs. A band-pass filter 9 followed by a demodulator 10 is connected to each of the 64 outputs, forming 64 channels. The amplifier 7, and other amplifiers still to be mentioned, must comply with the respective amplifier parameters (amplification, bandwidth), in order to optimally amplify the occurring electric signals. Depending on the application, the amplifiers may be omitted or further amplifiers may be added.

The light transmitted by transmitter 11 reaches the photodetector 6. In the usual case where several transmitters which are connected to the fiber-optic network 5 transmit light, the photodetector 6 receives light composed of several characteristic frequency-encoded spectra. When they strike the light-sensitive surface of the photodetector 6, these characteristic frequency-encoded spectra are superposed, thus forming a multitude of different frequencies in the GHz range. The resulting electric signal has a spectrum which is composed of a multitude of spectral lines. Each spectral line is assigned two sidebands. Since each spectral line results from a superposition of a characteristic frequency-encoded spectrum with itself and with other characteristic frequency-encoded spectra, the spectrum lines take place at previously fixed frequencies which were established within the framework of the network plan. In this way a desired spectrum line can be separated by the band-pass filter 9 from the other spectrum lines and demodulated by the demodulator 10. The band-pass filter 9 has a middle frequency of 10 GHz e.g., other band-pass filters 9 in the optical receiver 12 can have middle frequencies which differ 1 GHz from each other for example. The demodulated electric signal in the base-band emerges from an output of demodulator 10 and may be fed to a further signal processor.

Figure 2:
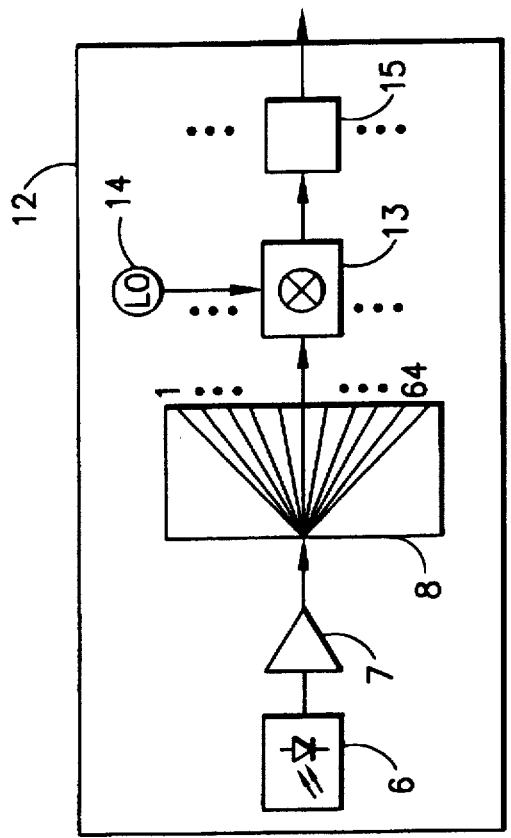

FIG. 2 illustrates a second configuration example of an optical receiver 12. The same reference symbols are used for the components of the optical receiver 12 already shown in FIG. 1. This second configuration example of optical receiver 12 differs from the one in FIG. 1 in that a modulator 13 is connected to each output (channel) of the branching device 8, which modulates an oscillator signal with a constant oscillator frequency through the electric signal generated by the photodetector 6. The oscillator signal is generated by a local oscillator 14, which is connected to the modulator 13. The optical receiver 12 furthermore contains (e.g. 63) local oscillators 14. Each of these local oscillators 14 generates an oscillator signal with a constant oscillator frequency, which is different for each channel. The local oscillator 14 is e.g. a voltage-controlled oscillator (VCO) whose construction and function are generally known.

How the electric signal emerging from modulator 13 is processed further depends on the chosen oscillator frequencies: each oscillator frequency can be chosen so that it equals the carrier frequency to be selected in this channel (homodyne reception). However, each oscillator frequency can also be chosen so that it differs from the carrier frequency to be selected in this channel (heterodyne reception).

In the homodyne reception case, a low-pass filter 15 is connected to the output of modulator 13; this case is illustrated in FIG. 2. The low-pass filter 15 allows the electric signal in the base-band to pass nearly undamped, and blocks parts of other potential signals which are above a limit frequency established for the low-pass filter 15.

In the heterodyne reception case, a band-pass filter with a demodulator is connected to the output of modulator 13. The modulator 13, the local oscillator 14 and the necessary components depending on the receiving method, form part of the decoding unit whereby information contained in the frequency-encoded spectrum can be recovered.

What is claimed is:

1. An optical transmission system wherein at least one optical transmitter (11) and at least one optical receiver (12) are connected to a fiber-optic network (5), and wherein the at least one optical transmitter (11) feeds light into the fiber-optic network (5) which has a frequency-encoded spectrum characteristic of the at least one optical transmitter (11), characterized in that the at least one optical receiver (12) has a single photodetector (6) which converts received light into an electric signal and which is connected, directly or indirectly, to a decoding device (9, 10; 13, 14, 15) to recover the information contained in the characteristic frequency-encoded spectrum.

2. An optical receiver (12) for an optical transmission system wherein at least one optical transmitter (11) is connected to a fiber-optic network (5), and wherein the at least one optical transmitter (11) feeds light into the fiber-optic network (5) which has a frequency-encoded spectrum characteristic of the at least one optical transmitter (11), characterized in that its input signal is light with a spectrum consisting of at least one characteristic frequency-encoded spectrum, and that it has a signal photodetector (6) which converts the light into an electric signal and which is connected, directly or indirectly, to a decoding device (9, 10; 13, 14, 15) to recover the information contained in the characteristic frequency-encoded spectrum.

3. An optical transmission system as claimed in claim 1, characterized in that the decoding device (9, 10; 13, 14, 15) comprises a bandpass filter (9) for filtering the electric signal and a demodulator (10) for demodulating the electric signal coming from the bandpass filter (9).

4. An optical transmission system as claimed in claim 1, characterized in that the decoding device (9, 10; 13, 14, 15) comprises a modulator (13) for modulating a fixed-frequency signal generated by an oscillator (14) with the electric signal and a low-pass filter (15) for filtering the electric signal coming from the modulator (13).

5. An optical transmission system as claimed in claim 1, characterized in that the decoding device (9, 10; 13, 14, 15) comprises a modulator (13) for modulating a fixed-frequency signal generated by an oscillator (14) with the electric signal, a bandpass filter connected to the modulator (13), and a demodulator for demodulating the electric signal coming from the bandpass filter.

6. An optical receiver as claimed in claim 2, characterized in that the decoding device (9, 10; 13, 14, 15) comprises a bandpass filter (9) for filtering the electric signal and a demodulator (10) for demodulating the electric signal coming from the bandpass filter (9).

7. An optical receiver as claimed in claim 2, characterized in that the decoding device (9, 10; 13, 14, 15) comprises a modulator (13) for modulating a fixed-frequency signal generated by an oscillator (14) with the electric signal and a low-pass filter (15) for filtering the electric signal coming from the modulator (13).

8. An optical receiver as claimed in claim 2, characterized in that the decoding device (9, 10; 13, 14, 15) comprises a modulator (13) for modulating a fixed-frequency signal generated by an oscillator (14) with the electric signal, a bandpass filter connected to the modulator (13), and a demodulator for demodulating the electric signal coming from the bandpass filter.

* * * * *